Sept. 12, 1933.     A. WRIGHT ET AL     1,926,252
MEANS FOR THE REDUCTION OR THE ELIMINATION OF THE DEPOSIT
OF SCALE ON HEATING ELEMENTS OF WATER HEATERS
Filed July 20, 1931     2 Sheets-Sheet 2
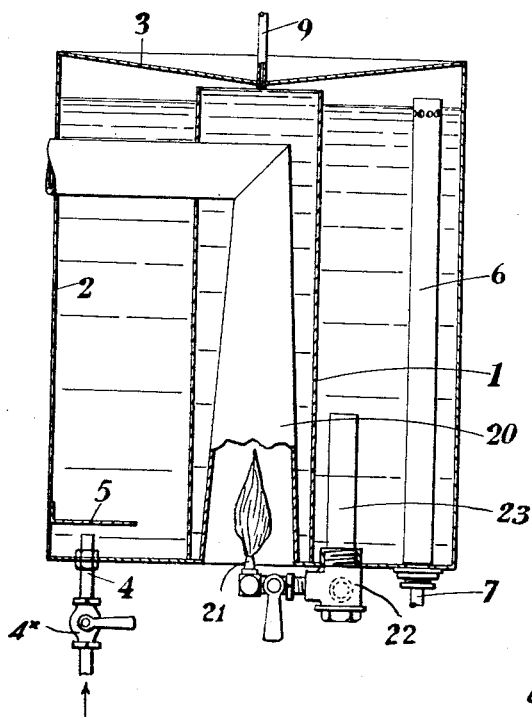

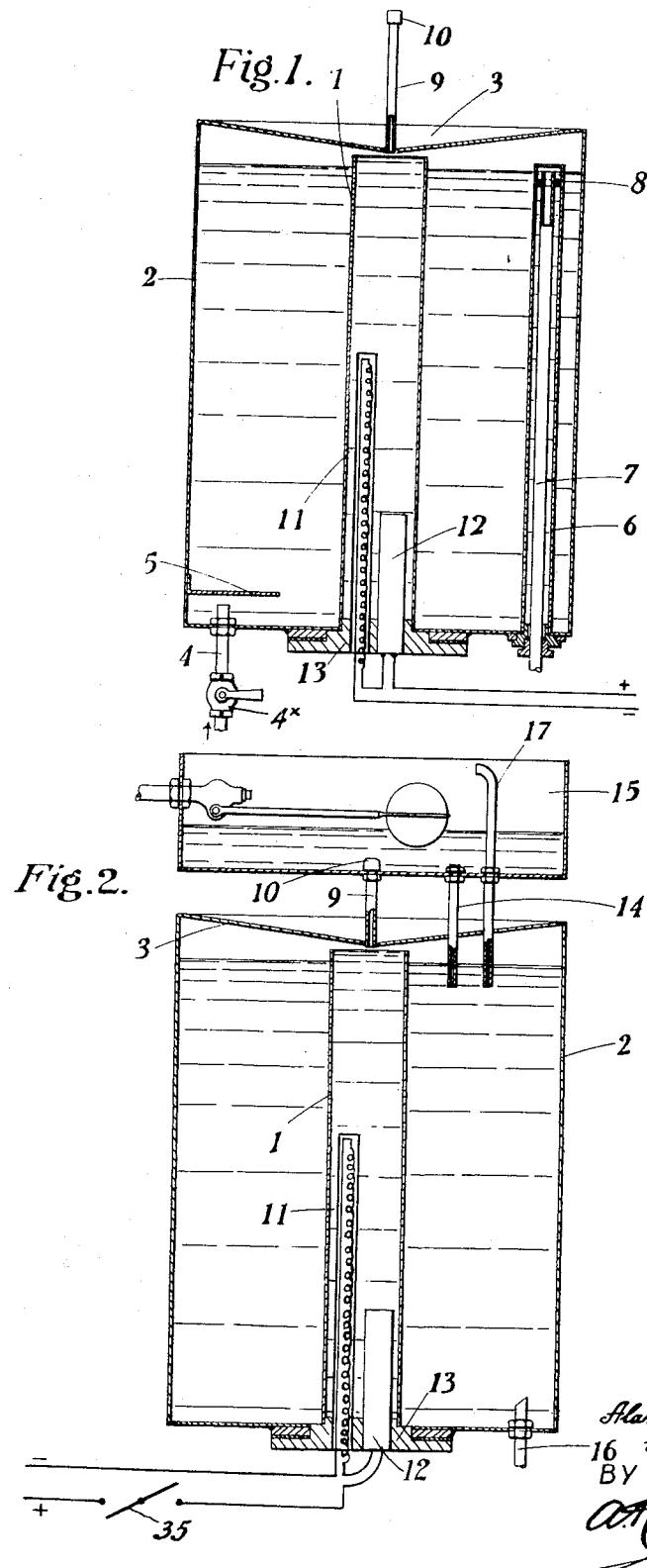

Patented Sept. 12, 1933

1,926,252

UNITED STATES PATENT OFFICE 1,926,252

MEANS FOR THE REDUCTION OR THE ELIMINATION OF THE DEPOSIT OF SCALE ON HEATING ELEMENTS OF WATER HEATERS

Alan Wright, Kingston-upon-Thames, and Henry James Osborn, Danbury, England

Application July 20, 1931, Serial No. 551,966, and in Great Britain August 23, 1930

8 Claims. (Cl. 126—350)

This invention relates to water heaters, and although the invention is particularly adapted for use with electric water heaters and the like it is not necessarily limited thereto, and it has for its object the provision of means for reducing or eliminating the deposit of scale on the heating elements or on the walls of the heating chamber containing such elements.

The invention consists in the provision of a surface or surfaces within and above the water level of the heater for the purpose of condensing the water vapour produced when the heater is in operation, the condensate being conducted to a separate heating chamber or chambers within the heater in which the heating elements are located, for the purpose of reducing the deposit of scale on such elements or on the walls of the heating chamber. The heating elements may be controlled automatically by a thermostatic device located in the heater or by a manually operated switch located exterior of the heater.

In the accompanying drawings which diagrammatically illustrate this invention in sectional elevation:—

Figure 1 illustrates the invention applied to an electric water heater having a centrally located heating chamber in which an electric heating element is placed, the inlet for the water provided with a stop cock being arranged at the bottom of the storage vessel and the outlet pipe arranged for free discharge;

Figure 2 illustrates a similar form of heater, the water being supplied from a cistern located above the heater;

Figure 3 illustrates the invention applied to a water heater heated by gas.

Referring to Figure 1, 1 is the heating vessel and 2 the storage vessel provided with a cover 3 in the form of an inverted cone, the exterior surface of said storage vessel being suitably lagged to prevent the dissipation of heat, the apex of the cone being located coaxial with the vessel 1. Water is supplied to the vessel 2 through the inlet pipe 4 provided with a stop cock $4^x$, a baffle plate 5 being arranged above the inlet to spread the water laterally as it enters the chamber 2, and the heated water passes through an outlet combined with a water levelling device comprising two concentrically disposed tubes 6 and 7, the tube 7 being arranged so that it may be withdrawn independently of the tube 6 so that it may be removed for cleaning without emptying the storage vessel 2. The upper end of the tube 6 is closed and furnished with a plurality of small apertures 8 located in such a relation to the upper end of the inner tube 7 that when cold water is admitted through the inlet 4 the hot water will flow out of the tube 7 and the top of the tube 6 acts as a syphon to restore the normal water level in the vessel 2 without allowing it to drip. A sufficient margin is provided between the levels of the apertures 8 and top of the tube 7 to allow for expansion of the water due to heating.

In use, the vessel 1 is first filled with water through the tube 9 which is then closed by the cap 10, said cap being furnished at the top with a small aperture. The greater part of any water evaporated from the surfaces of the water in the vessels 1 and 2 is condensed on the underside of the cover 3 and the condensate is conducted to the vessel 1. It has been found in practice that the area of the condensing and conducting surface or surfaces should not be less, but preferably greater, than the area of the exposed sides of the vessel 2 above the normal water level in the storage vessel.

Since for any given temperature, pressure and saturation conditions, the rate of evaporation per unit area at the surface of the water in vessels 1 and 2 will be the same, and since the area of water exposed in vessel 2 is much greater than that exposed in vessel 1, it follows that the inflow of condensed water into vessel 1 will be in excess of the water evaporated from said vessel.

It will thus be seen that although the vessel 1 may originally be filled with hard water, in use this is constantly being replaced by distilled water from which all hardness has been removed and therefore there will be little, if any, scale deposited on the heating element 11, on the wall of the casing 12 containing the thermostatic device or on the inner wall of heating vessel 1, containing such elements.

In Figure 2 the water is supplied to the vessel 2 by gravity through the inlet pipe 14 from a cistern 15 on opening the outlet 16. A pipe 17 is provided for enabling air to enter the vessel 2 as the water is withdrawn therefrom, the lower end of said pipe and that of the inlet pipe 14 being normally below the normal level of the water in said vessel. In this case no hole is provided in the cap 10. In this construction the heating element 11 is shown controlled by a manually operated switch 35.

Figure 3 illustrates the invention as applied to a water heater heated by gas. In this embodiment the heating element takes the form of a flue 20, the upper end of which passes to the outside through the walls of the vessels 1 and 2. The gas burner 21 which may be of any desired form is located immediately below the flue 20.

If desired the supply of gas to the burner 21 may be controlled by an automatic thermostatically operative valve 22 arranged to control said gas in accordance with the expansion and contraction of a thermostatic element in the tube 23 which is rigidly connected with said valve. Although any suitable form of said valve 22 may be employed, that indicated is a specific form described and claimed by Arthur E. Paige in the Specification to United States Letters Patent No. 1,542,573, granted June 16, 1925, for "Improvements in thermostatically controlled valves." The tube 23 may be located either in the vessel 1 or as shown in the vessel 2.

What we claim is:—

1. A water heater comprising in combination a storage vessel having water inlet and outlet means arranged to maintain a definite depth of water therein, a heating vessel positioned within said storage vessel, said heating vessel having an open end extending above the water level in the storage vessel, means for admitting water to the heating vessel, means disposed within the heating vessel for heating the water therein, and means disposed above the heating vessel for condensing the water vapor from both vessels and conducting the condensate to the heating vessel.

2. A water heater comprising in combination a storage vessel having water inlet and outlet means arranged to maintain a definite depth of water therein, a heating vessel positioned within said storage vessel, said heating vessel having an open end extending above the water level in the storage vessel, means for admitting water to the heating vessel, means disposed within the heating vessel for heating the water therein, and means disposed above the storage and heating vessels for condensing the water vapor from both vessels and conducting the condensate to the heating vessel.

3. A water heater comprising in combination a storage vessel having water inlet and outlet means arranged to maintai na definite depth of water therein, a heating vessel positioned within said storage vessel, said heating vessel having an open end extending above the water level in the storage vessel, means for admitting water to the heating vessel, means disposed within the heating vessel for heating the water therein, and an inverted cone disposed above the storage and heating vessel for condensing the water vapor from both vessels and conducting the condensate to the heating vessel.

4. A water heater comprising in combination a storage vessel having water inlet and outlet means arranged to maintain a definite depth of water therein, a heating vessel positioned within said storage vessel, said heating vessel having an open end extending above the water level in the storage vessel, means disposed within the heating vessel for heating the water therein, and an inverted cone disposed above the storage and heating vessels with the apex of the cone co-axially aligned with respect to the heating vessel for condensing the water vapor from both vessels and conducting the condensate to said heating vessel.

5. A water heater comprising in combination a storage vessel having water inlet and outlet means arranged to maintain a definite depth of water therein, a heating vessel centrally positioned within said storage vessel, said heating vessel having an open end extending above the water level in the storage vessel, means disposed within the heating vessel for heating the water therein, and an inverted cone disposed above the storage and heating vessels, the apex of said cone being co-axial with respect to the heating vessel for condensing the water vapor from both vessels and conducting the condensate to said heating vessel.

6. A water heater comprising in combination a storage vessel having water inlet and outlet means arranged to maintain a definite depth of water therein, said storage vessel having an exposed lateral area extending from the water level to the top edge thereof, a heating vessel positioned within said storage vessel, said heating vessel having an open end extending above the water level in the storage vessel, means for admitting water to the heating vessel, means disposed within the heating vessel for heating the water therein, and an inverted cone forming a condensing and conducting surface disposed above the storage and heating vessels for condensing the water vapor from both vessels and conducting the condensate to said heating vessel, said condensing and conducting surface having an area at least as great as the said exposed lateral area above the level of the water in the storage tank.

7. A water heater comprising in combination a storage vessel having water inlet and outlet means arranged to maintain a definite depth of water therein, a heating vessel positioned within said storage vessel, said heating vessel having an open end extending above the water level in the storage vessel, means for admitting water to the heating vessel, means disposed within the heating vessel for heating the water there in, and an inverted cone disposed over a substantial portion of the storage vessel, the apex of said cone being co-axial with respect to the heating vessel for condensing the water vapor from both vessels and conducting the condensate to said heating vessel.

8. A water heater comprising in combination a storage vessel having water inlet and outlet means arranged to maintain a definite depth of water therein, a heating vessel positioned within said storage vessel, said heating vessel having an open end extending above the water level in the storage vessel, means for admitting water to the heating vessel, a flue within said heating vessel, a burner within said flue for heating the water in said vessel, said flue communicating with the atmosphere, and means disposed above the heating vessel for condensing the water vapor from both vessels and conducting the condensate to the heating vessel.

ALAN WRIGHT.
HENRY JAMES OSBORN.